United States Patent
Wu et al.

(10) Patent No.: US 8,838,858 B1
(45) Date of Patent: Sep. 16, 2014

(54) MANAGING COMMAND LINE INTERFACE COMMANDS

(75) Inventors: Yuanjie Wu, Shanghia (CN); James F. Britton, Framingham, MA (US); Subbulakshmi Premkumar, Sudbury, MA (US); Rongzhang Wu, Shanghia (CN); Yiyang Zhang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 213 days.

(21) Appl. No.: 13/334,665

(22) Filed: Dec. 22, 2011

(51) Int. Cl.
*G06F 3/00* (2006.01)
*G06F 13/12* (2006.01)
*G06F 5/00* (2006.01)
*G06F 9/445* (2006.01)

(52) U.S. Cl.
CPC ............. *G06F 5/00* (2013.01); *G06F 9/44505* (2013.01)

USPC ................................. 710/65; 710/11; 710/15

(58) Field of Classification Search
CPC ............... G06F 5/00; G06F 9/44505
See application file for complete search history.

(56) References Cited

U.S. PATENT DOCUMENTS 6,950,990 B2 * 9/2005 Rajarajan et al. ............. 715/736

* cited by examiner

*Primary Examiner* — Zachary K Huson
(74) *Attorney, Agent, or Firm* — Krishnendu Gupta; Jason A. Reyes

(57) ABSTRACT

A method is used in managing command line interface commands. Legacy CLI command information is received at a command line interface (CLI) provider. At the CLI provider, it is determined to convert the legacy CLI command information. The CLI provider has an adapter for performing the conversion. Updated CLI command information is derived by the adapter from the legacy CLI command information. The updated CLI command information is submitted to a plugin for processing.

16 Claims, 3 Drawing Sheets

MANAGING COMMAND LINE INTERFACE COMMANDS

BACKGROUND OF THE INVENTION

1. Field of the Invention

The present invention relates to managing command line interface commands.

2. Description of Prior Art

Client-server computer storage configurations or networks are well known. The "client" (human user, command line interface (CLI), graphical user interface (GUI), or workstation, etc.) is operatively coupled to hardware/software functionality known as the "server" which services the client by responding to client requests to store information and/or retrieve stored information. Multiple clients can be operatively coupled to multiple servers in a particular client-server network configuration.

Effective management of client-server networks is very important to ensure that the networks operate as intended and serve network users as expected. This management function may be accomplished through distributed management software which can be distributed throughout a client-server network. If a client-server network is running such software that is also object-oriented, typically many objects reside in each of the clients and/or servers. An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g. commands) but shall normally be impervious to internal scrutiny. For example, in a storage processor each object may describe or relate to a specific tangible detail in the processor (e.g. a fan, power switch, cache memory, power supply, disk drive interface, etc.). These tangible objects in the storage processor can send messages to each other and to other objects outside the processor such as a disk array.

In management software running within its client-server environment, there may be a group of service providers termed "providers", which are delegated specific managerial tasks to perform within the distributed management software of the client-server system, i.e. they are delegated specific services to "provide". In a CLARiiON® storage system marketed by EMC Corporation, such providers may include: directory provider, persistence (file replication) provider, security provider, snapshot copying (backups and data modeling) provider, mirroring (permanent backup storage) provider, clone (local replication) provider, logical volume ("LUN") provider (creates or destroys LUNs), meta LUNs (virtualization) provider, etc. Each provider is concerned only with performing its own prescribed task. These providers are, of course, software entities, but they may be modular in design. They can, therefore, be modularly "plugged" into a software framework allowing easily-made additions to, or reductions of, the overall functionality of the storage system's management software. These providers act upon objects and although each provider is concerned with performing only its own task, it may act upon one or more objects that are also being acted upon by other providers.

In computing, the command line interface or CLI is a method of interacting with a computer such as a storage system via a text terminal such as terminal software running on a client computer. Commands are entered as lines of text (that is, sequences of typed characters) from a keyboard, and output is also received as text.

In at least some cases, CLIs provide an environment with enhanced productivity. They are often used by system administrators. In its simplest form, a CLI displays a prompt, the user types a command on the keyboard and terminates the command (usually with the Enter key), and the computer executes the command, providing textual output.

The Windows operating system commercially available from Microsoft Corp. of Redmond, Wash. stores information used by the Windows operating system and other programs running under the Windows operating system in a Windows registry. The Windows registry contains values used to control the operation of the Windows operating system and other programs running under the Windows operating system. In addition to these values, the Windows registry also contains keys which identify each of the values. The Windows operating system and many computer programs running under the Windows operating system insert keys and values into the Windows registry so that the operating system and programs can operate properly.

SUMMARY OF THE INVENTION

A method is used in managing command line interface commands. Legacy CLI command information is received at a command line interface (CLI) provider. At the CLI provider, it is determined to convert the legacy CLI command information. The CLI provider has an adapter for performing the conversion. Updated CLI command information is derived by the adapter from the legacy CLI command information. The updated CLI command information is submitted to a plugin for processing.

DETAILED DESCRIPTION

Described below is a technique for use in managing command line interface commands, which technique may be used to help provide, among other things, a Windows registry based legacy-to-updated storage system management system CLI syntax converter. As described below, in at least one example implementation, an updated storage management interface ("Unisphere" or "UEM") reflects a shift in CLI client/syntax away from a legacy storage management interface ("Navisphere"), and CLI plugins have been developed to support a new updated CLI syntax. At the same time in at least some cases it is required to support legacy CLI clients/syntax as well, and the converter enables updated CLI commands to be derived from legacy CLI commands and sent to a CLI plugin that supports the updated CLI syntax. In the example implementation, when a user initiates a CLI command through the legacy CLI client, a CLI provider checks the Windows registry to determine whether the command is a candidate for conversion to the updated CLI syntax, and if so, the CLI provider uses related registry keys to perform appropriate syntax conversion, and sends the resulting updated CLI command to the new CLI plugin.

Without the technique, a developer would be required to implement two CLI plugins to support legacy and updated syntax separately. By contrast, by use of the technique, much effort can be saved by avoiding developing duplicated functionality.

Figure 1:
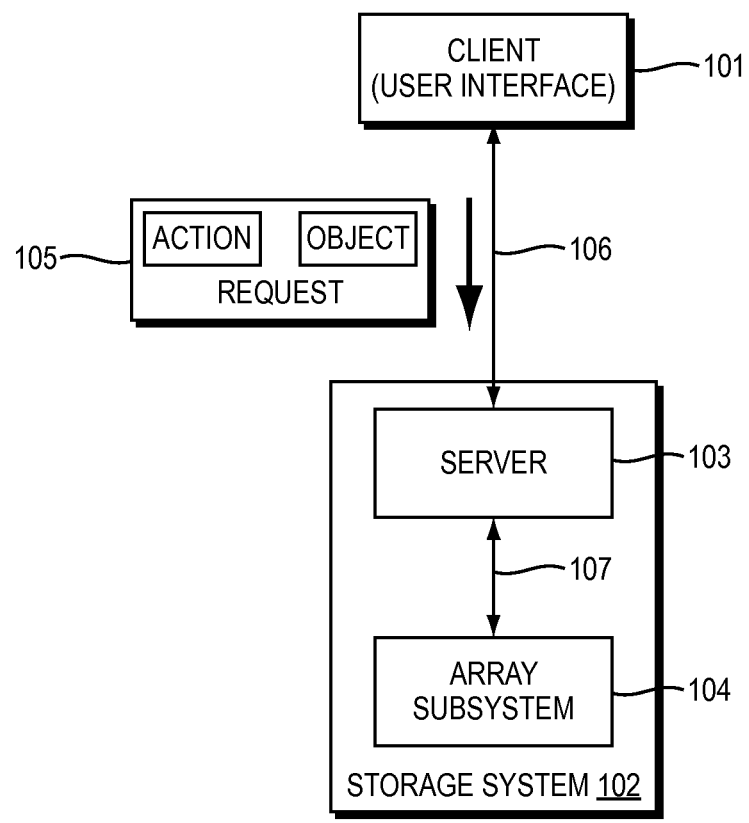
FIGS. 1-3 are illustrations of aspects of one or more example computer systems that may be used with the invention.

Referring to FIG. 1, shown is an example of an embodiment of a computer system that may be used in connection with performing the techniques described herein. Client 101 may be a typical workstation or graphical user interface (GUI) operatively coupled to storage system ("array") 102 which may be, for example, similar to those manufactured by EMC Corporation, the assignee of the present invention. This coupling can be achieved via link 106 which can be, for example, a hyper text transfer protocol (HTTP) link. Storage system 102 includes management server 103 operatively coupled to array subsystem 104 by way of link 107 which can be, for example, an IOCTL protocol link (IOCTL means Input/Output Control, which is a well known protocol or special application programmers' interface for passing messages between software processes). Server 103 receives input requests, such as request 105, from Client 101 and serves-up responses to those requests from array subsystem 104. Request 105 can be coded in, for example, XML language. Array subsystem 104 may be a typical RAID configuration. Client request 105 is shown containing an action and an object, and is intended to represent a request or command by client 101 to take that specific action upon that specific object.

Requests, such as request 105, from client 101, may be honored or responded to. In general, with reference also to FIG. 2 described in more detail below, each of the providers 204-206 is software functionality which acts independently on its own set of objects. For example, a provider may act on a set of LUNs and may know only about its own set of objects or LUNs, but sets of objects for different providers may intersect. Every object initially belongs to one and only one provider, but each object can be referenced by more than one provider, and in that sense, can belong to more than one provider. In other words, each provider can grow its set of objects by extending its domain, or sphere of influence, over objects that initially belonged only to other providers. Every provider can perform operations on all of the objects in its set, regardless of whether that object was in its set initially or resulted from an extension of its domain.

Figure 2:
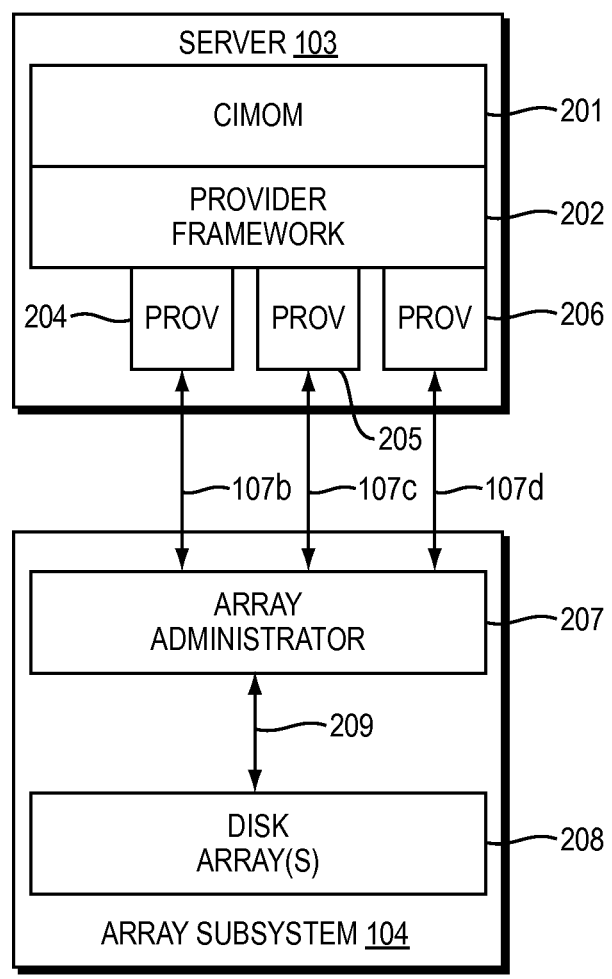

FIG. 2 is an exemplary block diagram of a storage system reflecting embodiments of the present invention. Server 103 includes CIMOM 201, provider framework 202 and a number of providers 204-206. It should be understood that many more, or fewer, providers can be used. Array subsystem 104 includes an array administration interface or array administrator 207 and disk array(s) 208. CIMOM 201 is an object manager configured in accordance with the Storage Network Industry Association Common Information Model (SNIA/CIM) standard or protocol and receives requests such as request 105 from client 101. CIMOM 201 provides a framework for services offered by providers that plug into it, such as provider framework 202 with which it is operatively coupled. A provider is a plug-in into the CIMOM that provides a specific service, such as managing a storage feature.

Providers 204-206 may be implemented as dynamic link libraries (DLLs) loaded into the CIMOM process. Accordingly, they can "plug in" to provider framework 202 in a modular fashion and are thereby communicatively coupled to CIMOM 201. The providers may also be communicatively coupled to each other through CIMOM 201. Providers 204-206 may be removed, depending on whether or not their functionality is essential for operation of the system and others (not shown) may be added by plugging-in to framework 202.

Array administrator or administration interface 207 is the interface through which all storage system management is performed, regardless of which array feature or driver may be targeted. Providers 204-206 are communicatively coupled by way of inter-process communication links 107a-107d to array administration interface 207. Thus, on the client side of the interface, it may be accessed using application programmer interface (API) calls. On the array side of the interface it may use IOCTL calls to communicate with the managed drivers. Link 209 operatively couples array administrator 207 to disk array(s) 208 which, therefore, can be an IOCTL link.

Figure 3:
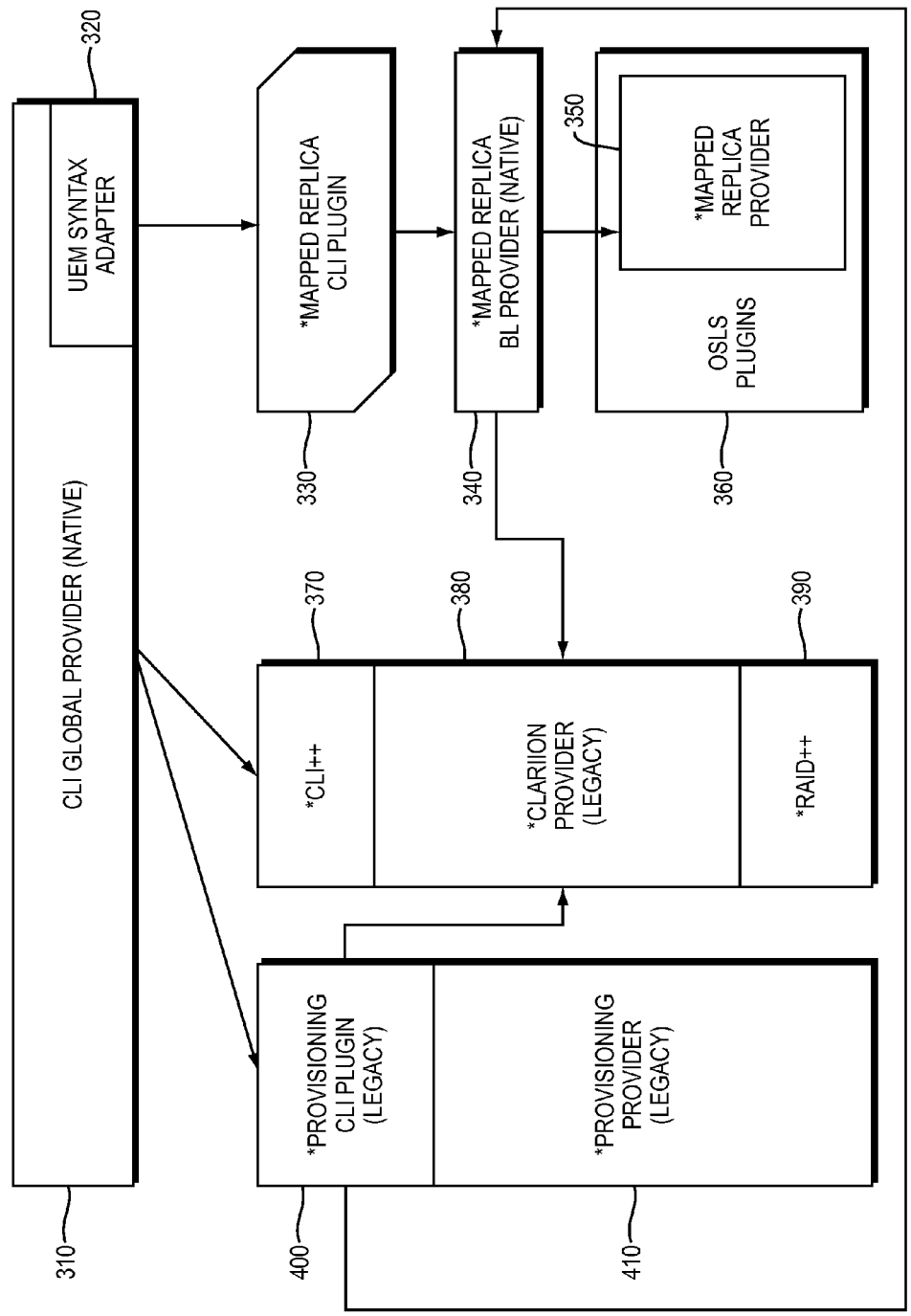

FIG. 3 illustrates an example implementation of the system of FIG. 2 based on the technique described herein, in which, as described further below, a provider 310 having a syntax adapter 320 uses the adapter 320 to convert a legacy CLI command to an updated CLI command which is submitted to a mapped replica CLI plugin 330 which processes the updated CLI command and drives mapped replica business logic provider 340 and mapped replica provider 350 in accordance with the updated CLI command. Provider 350 may be included in OSLS plugins, and provider 310 may submit other CLI commands to other plugins 400, 370 of other providers and logic 410, 380, 390. OSLS (Open Storage Layer Sharp) is an object-oriented, cross-platform C++ API for developing management applications that can interact with storage resources, such as storage devices, switches, servers, and the like.

With reference to FIGS. 1, 3, client 101 may include a legacy CLI client that may need to communicate properly with plugin 330. Plugin 330 can properly interpret an updated CLI syntax and protocol but cannot properly interpret legacy CLI syntax and protocol from the legacy CLI client. Adapter 320 can change the legacy CLI syntax and protocol into an updated CLI syntax and protocol so that a proper updated CLI command can be sent to plugin 330 based on communication from the legacy CLI client.

In a previous system, the legacy CLI client accepts user input including parameters and switches at a command line, transfers the input to an XML request, and sends the XML request to a CLI provider running on the storage system. In such previous system, the CLI provider recognizes the XML request and tries to parse the XML to retrieve the words that the user inputted on the command line, determines which CLI plugin should be used for this specific command, and passes the parameters and switches that the user inputted to the plugin for handling.

In accordance with the technique as described herein, instead of having two CLI plugins corresponding to the legacy and updated CLI syntaxes, adapter 320 translates or converts from the legacy syntax to the updated syntax. Accordingly in accordance with the technique, the updated CLI plugin is the only plugin needed.

In a specific example, adapter 320 is used for a CLI commands related to snapshots which are a mapped replica feature. In at least some implementations, the system is organized so that each CLI command or set of CLI commands is handled by its own CLI plugin; for example, a storage pool command plugin handles storage pool commands to create a storage pool, to list a storage pool in the CLI interface, and a LUN command plugin handles LUN commands to create or destroy or list LUNs via the CLI interface.

In at least one implementation, each CLI plugin is a special module that handles handle certain specific CLI commands and that plugs into the storage management system. Plugin 330 handles snapshot CLI commands. If the user types a command "snap-create", plugin 330 handles the switches and parameters that the user inputted and sends a proper request to the provider.

In a detailed example, a user writes a CLI command in a command line window, and a secure CLI client gets it and tries to parse the command, assemble a special XML request, and send the XML request to the CLI provider 310. The CLI provider tries to parse the XML request and determine which CLI plugin should be responsible for handling this command, and then sends a parameter and switch list to the responsible plugin 330. The plugin tries to do some extra parsing work, e.g., to determine whether the switches or values inputted by the user are valid or acceptable. If the plugin find no problems, the plugin tries to assemble another request to a proper provider 340. For example, if there is a need to create a snapshot, the user can specify the source object to take a snapshot of, and the user can also provide a name for the snapshot. The CLI plugin tries to find out a valid source object specified by user and can also check whether the name already exists, and then calls method in an API exposed by the provider 340 to attempt to create the snapshot, and provider 340 returns and reports back to plugin 330 whether the attempt failed or succeeded. If the attempt failed, provider 340 returns with a proper error code and messages. If the attempt succeeded, provider 340 returns with 0. The CLI plugin then sends back information to the CLI provider which can assemble this information into an XML response and return the response to the CLI client for display on the user's CLI display.

Provider 310 has adapter 320 so that after the user types in a command as a CLI request, the CLI request is converted to XML and sent to provider 310 which parses the XML to determine the proper plugin 330 to handle the CLI request. Adapter 320 of provider 310 converts the CLI request to the updated syntax and then sends the resulting updated CLI request to plugin 330.

In at least one example implementation, a Windows registry is used to store info for use by adapter 320 and provider 310 to convert the CLI request to the updated syntax.

For example, to destroy a snapshot, a legacy CLI command may have the syntax "naviseccli snap-destroy-id snapName [-o]" and the updated CLI may have the syntax "uemcli/prot [ection]/snap-id<value>delete".

In the example implementation, special registry values map the snapshot command as a special command that needs converting, which flags provider 310 that additional processing (by adapter 320) is required before plugin 330 can be called.

Shown below are examples of registry information that may be used for converting from the legacy command to the updated command. For example, [HKEY_LOCAL_MACHINE\SOFTWARE\Wow6432Node\EMC\ManagementServer\CLIContent\ConvergedCommands\snapcli\snap] specified updated (UemCommand) command "/prot/snap" so that updated command "/prot/snap" is used when a legacy "snap" command is specified. In another example, [HKEY_LOCAL_MACHINE\SOFTWARE\Wow6432Node\EMC\ManagementServer\CLIContent\ConvergedCommands\snapcli\snap\-destroy] has an Action "delete" so that an updated "delete" parameter is used when a legacy "-destroy" switch is specified. In another example, [HKEY_LOCAL_MACHINE\SOFTWARE\Wow6432Node\EMC\ManagementServer\CLIContent\ConvergedCommands\snapcli\snap\-list]: has an Action "show" so that an updated "show" parameter is used when a legacy "-list" switch is specified.
[HKEY_LOCAL_MACHINE\SOFTWARE\Wow6432Node\EMC\ManagementServer\CLIContent\ConvergedCommands]: new key.
[HKEY_LOCAL_MACHINE\SOFTWARE\Wow6432Node\EMC\ManagementServer\CLIContent\ConvergedCommands\snapcli]: new key.

| Name | Type | Data |
|---|---|---|
| Commands | REG_MULTI_SZ | snap |

[HKEY_LOCAL_MACHINE\SOFTWARE\Wow6432Node\EMC\ManagementServer\CLIContent\ConvergedCommands\snapcli\snap]: new key.

| Name | Type | Data |
|---|---|---|
| EntryPoint | REG_SZ | SnapshotGroupEntry |
| UemCommand | REG_SZ | /prot/snap/ |
| UsagePath | REG_SZ | C:\EMC\ManagementServer\<version>\ECOMCIMOM\providers\usage_snap.txt |

[HKEY_LOCAL_MACHINE\SOFTWARE\Wow6432Node\EMC\ManagementServer\CLIContent\ConvergedCommands\snapcli\snap\-attach]: new key.

| Name | Type | Data |
|---|---|---|
| Action | REG_SZ | attach |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap\-copy]: new key.

| Name | Type | Data |
|---|---|---|
| Action | REG_SZ | copy |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap\-create]: new key.

| Name | Type | Data |
|---|---|---|
| Action | REG_SZ | create |
| Qualifiers | REG_MULTI_SZ | |

[HKEY_LOCAL_MACHINE\SOFTWARE\Wow6432Node\EMC\ManagementServer\CLIContent\ConvergedCommands\snapcli\snap\-destroy]: new key.

| Name | Type | Data |
|---|---|---|
| Action | REG_SZ | delete |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap\-detach]: new key.

| Name | Type | Data |
|---|---|---|
| Action | REG_SZ | detach |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap\-list]: new key.

| Name | Type | Data |
|---|---|---|
| Action | REG_SZ | show |
| Qualifiers | REG_MULTI_SZ | -id<br>-resType<br>-res |

[HKEY_LOCAL_MACHINE\SOFTWARE\Wow6432Node\EMC\ManagementServer\CLIContent\ConvergedCommands\snapcli\snap\-modify]: new key.

| Name | Type | Data |
|---|---|---|
| Action | REG_SZ | set |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap\-restore]: new key.

| Name | Type | Data |
|---|---|---|
| Action | REG_SZ | restore |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap\-group]: new key.

| Name | Type | Data |
|---|---|---|
| EntryPoint | REG_SZ | SnapshotGroupEntry |
| UemCommand | REG_SZ | /prot/snap/group |
| UsagePath | REG_SZ | C:\EMC\ManagementServer\<version>\ECOMCIMOM\providers\usage_snap.txt |

[HKEY_LOCAL_MACHINE\SOFTWARE\Wow6432Node\EMC\ManagementServer\CLIContent\ConvergedCommands\snapcli\snap-group\-addmember]: new key.

| Name | Type | Data |
|---|---|---|
| Action | REG_SZ | addMember |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap-group\-create]: new key.

| Name | Type | Data |
|---|---|---|
| Action | REG_SZ | create |
| Qualifiers | REG_MULTI_SZ | |

[HKEY_LOCAL_MACHINE\SOFTWARE\Wow6432Node\EMC\ManagementServer\CLIContent\ConvergedCommands\snapcli\snap-group\-destroy]: new key.

| Name | Type | Data |
|---|---|---|
| Action | REG_SZ | delete |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap-group\-list]: new key.

| Name | Type | Data |
|---|---|---|
| Action | REG_SZ | show |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap-group\-modify]: new key.

| Name | Type | Data |
|---|---|---|
| Action | REG_SZ | set |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap-group\-addmember]: new key.

| Name | Type | Data |
|---|---|---|
| Action | REG_SZ | addMember |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap-group\-replmember]: new key.

| Name | Type | Data |
|---|---|---|
| Action | REG_SZ | replaceMember |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap-group\-rmmember]: new key.

| Name | Type | Data |
|---|---|---|
| Action | REG_SZ | removeMember |
| Qualifiers | REG_MULTI_SZ | -id |

[HKEY_LOCAL_MACHINE\SOFTWARE\Wow6432Node\EMC\ManagementServer\CLIContent\ConvergedCommands\snapcli\snap-feature]: new key.

| Name | Type | Data |
|---|---|---|
| EntryPoint | REG_SZ | SnapshotFeatureEntry |
| UemCommand | REG_SZ | /prot/snap/feature |
| UsagePath | REG_SZ | C:\EMC\ManagementServer\\<version>\ECOMCIMOM\providers\usage_snap.txt |

[HKEY_LOCAL_MACHINE\SOFTWARE\Wow6432Node\EMC\ManagementServer\CLIContent\ConvergedCommands\snapcli\snap-feature\-info]: new key.

| Name | Type | Data |
|---|---|---|
| Action | REG_SZ | show |
| Qualifiers | REG_MULTI_SZ | |

Various computer systems in which implementations operating in accordance with the technique described herein may act. It should be appreciated, however, that these computer systems are merely illustrative of the types of computer systems in which implementations operating according to the technique may act and that any suitable computer system may be used.

It should be appreciated that various aspects of the technique may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for use in managing command line interface commands, the method comprising:
   receiving, at a command line interface (CLI) provider, legacy CLI command information;
   determining, at the CLI provider, to convert the legacy CLI command information to updated CLI command information, the CLI provider having an adapter for performing the conversion, wherein determining to convert comprises checking a registry to determine that the legacy CLI command information is a candidate for conversion to updated CLI command information;
   based on registry keys, deriving, by the adapter, updated CLI command information from the legacy CLI command information; and;
   submitting the updated CLI command information to a plugin for processing.

2. The method of claim 1, wherein the legacy CLI command information is used by a Windows registry based CLI syntax converter.

3. The method of claim 1, wherein the plugin support a new updated CLI syntax.

4. The method of claim 1, wherein a user initiates a CLI command through a legacy CLI client that is in communication with the CLI provider.

5. The method of claim 1, wherein the legacy CLI command information includes parameters and switches that are transferred to an XML request sent to the CLI provider.

6. The method of claim 1, wherein the CLI provider determines which CLI plugin should handle the legacy CLI command information.

7. The method of claim 1, wherein the legacy CLI command information includes replica command information that is handled by a relica command plugin.

8. The method of claim 1, wherein the legacy CLI command information includes storage pool command information that is handled by a storage pool command plugin.

9. A system for use in managing command line interface commands, the system comprising:
   receiving, at a command line interface (CLI) provider, legacy CLI command information;
   determining, at the CLI provider, to convert the legacy CLI command information to updated CLI command information, the CLI provider having an adapter for performing the conversion, wherein determining to convert comprises checking a registry to determine that the legacy CLI command information is a candidate for conversion to updated CLI command information;
   based on registry keys, deriving, by the adapter, updated CLI command information from the legacy CLI command information; and;
   submitting the updated CLI command information to a plugin for processing.

10. The system of claim 9, wherein the legacy CLI command information is used by a Windows registry based CLI syntax converter.

11. The system of claim 9, wherein the plugin support a new updated CLI syntax.

12. The system of claim 9, wherein a user initiates a CLI command through a legacy CLI client that is in communication with the CLI provider.

13. The system of claim 9, wherein the legacy CLI command information includes parameters and switches that are transferred to an XML request sent to the CLI provider.

14. The system of claim 9, wherein the CLI provider determines which CLI plugin should handle the legacy CLI command information.

15. The system of claim 9, wherein the legacy CLI command information includes replica command information that is handled by a relica command plugin.

16. The system of claim 9, wherein the legacy CLI command information includes storage pool command information that is handled by a storage pool command plugin.

* * * * *